United States Patent
Hayashi

(10) Patent No.: US 6,573,921 B2
(45) Date of Patent: Jun. 3, 2003

(54) OPTICAL SCANNING DEVICE AND IMAGE FORMING APPARATUS USING THE OPTICAL SCANNING DEVICE

(75) Inventor: Yoshinori Hayashi, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/101,937

(22) Filed: Mar. 21, 2002

(65) Prior Publication Data

US 2002/0149663 A1 Oct. 17, 2002

(30) Foreign Application Priority Data

Mar. 21, 2001 (JP) .............................. 2001-079889

(51) Int. Cl.$^7$ .................... G03G 15/04; G02B 26/10
(52) U.S. Cl. ........................... 347/131; 347/252
(58) Field of Search ........................ 347/129, 131, 347/132, 247, 251, 252, 253, 254; 358/300

(56) References Cited

U.S. PATENT DOCUMENTS

| | | | |
|---|---|---|---|
| 5,818,489 A | * 10/1998 | Yoshinaga et al. | 347/131 |
| 6,091,512 A | * 7/2000 | Sasanuma et al. | 358/1.9 |
| 6,185,026 B1 | 2/2001 | Hayashi et al. | |
| 6,198,562 B1 | 3/2001 | Hayashi et al. | |
| 6,317,246 B1 | 11/2001 | Hayashi et al. | |
| 6,384,949 B1 | 5/2002 | Suzuki | 359/196 |
| 6,388,792 B1 | 5/2002 | Atsuumi et al. | 359/207 |
| 6,400,391 B1 | 6/2002 | Suhara et al. | |
| 6,400,917 B2 | 6/2002 | Nakazato et al. | |
| 6,417,509 B1 | 7/2002 | Atsuumi et al. | 250/234 |
| 6,429,956 B2 | 8/2002 | Itabashi | 359/204 |
| 6,448,998 B1 | 9/2002 | Suzuki et al. | 347/258 |
| 6,462,853 B2 | 10/2002 | Hayashi | |
| 2001/0013889 A1 | * 8/2001 | Hayashi et al. | 347/243 |

\* cited by examiner

Primary Examiner—Joan Pendegrass
(74) Attorney, Agent, or Firm—Oblon, Spivak, McClelland, Maier & Neustadt, P.C.

(57) ABSTRACT

An optical scanning device for optically scanning a surface of a photoconductor to form an electrostatic latent image thereupon. The scanning device includes a light source to emit a light flux and pulse modulate the light flux. A deflector deflects the light flux from the light source. A scanning image formation element condenses the light flux deflected by the deflector to form a scanning beam spot on the scanned surface. The scanning beam spot scans the scanned surface to form the electrostatic latent image on the scanned surface. A stationary beam spot, formed by stationary light flux on the scanned surface, has a stationary beam spot diameter ωm in a main scanning direction that is smaller than a stationary beam spot diameter ωs in a sub-scanning direction.

18 Claims, 8 Drawing Sheets

$$\sqrt{(\omega m^2 + D^2)} \times \{(\omega m + D)/\omega m\}^{1/8}$$

FIG. 7

| | λ (nm) | ωm (μm) | Do (μm) | Duty (%) | D (μm) | ωs (μm) | | SCANNING BEAM DIAMETER DEFINED BY 1/e^2 (μm) |
|---|---|---|---|---|---|---|---|---|
| | | | | | | FORMULA LOWER LIMIT | FORMULA UPPER LIMIT | |
| 1 | 400 | 16 | 21.2 | 100 | 21.2 | 26.6 | 32.5 | 29.5 |
| 2 | 400 | 30 | 21.2 | 100 | 21.2 | 35.3 | 43.2 | 39.3 |
| 3 | 650 | 40 | 21.2 | 100 | 21.2 | 43.0 | 52.5 | 47.7 |

OPTICAL SCANNING DEVICE AND IMAGE FORMING APPARATUS USING THE OPTICAL SCANNING DEVICE

CROSS REFERENCE TO RELATED APPLICATIONS

The present application claims priority and relates to Japanese Patent Application No. 2001-079889 filed on Mar. 21, 2001, the entire contents of which are incorporated herein by reference.

BACKGROUND OF THE INVENTION

1. Field of the Invention

The present invention relates to an optical scanning device having a light source which modulates a light flux by a pulse modulation method and an image forming apparatus including the optical scanning device.

2. Discussion of the Background

Laser printers and digital copying machines in recent years have progressed by increasing the resolution of an output image. Light sources of optical scanning devices for use for example in laser printers and digital copying machines have demanded that both the diameter of a stationary beam spot formed by a light flux on a scanned surface and the diameter of a scanning beam spot on the scanned surface be made smaller as the resolution increases.

Semiconductor lasers having an oscillating wavelength in a near-infrared region, for example about 780 nm, have been used mainly in the afore-mentioned optical scanning devices. However, a semiconductor laser having an oscillating wavelength in a near-infrared region has difficulty in producing a relatively small diameter scanning beam spot on a scanned surface because of diffraction limitations.

Assuming that an optical system for optical scanning devices does not have geometric aberrations, a lower limit value for a beam spot diameter (D) of a scanning beam spot on a scanned surface is expressed by the following formula: $D=1.22\lambda/NA$, where $\lambda$ represents a wavelength of a light source and NA represents a numerical aperture of the optical system. That is, the beam spot diameter D of a scanning beam spot on a scanned surface is in direct proportion to the wavelength $\lambda$ of a light source. Accordingly, making the wavelength of a light source relatively small is effective for making the diameter of a scanning beam spot on a scanned surface smaller.

However, if the diameter of a scanning beam spot on a scanned surface of a photoconductor is made excessively small, a reciprocity phenomenon as discussed below occurs which broadens an electrostatic latent image formed by the scanning beam spot on the scanned surface, so that the resolution of an image resulting from the electrostatic latent image is decreased.

When a light source is configured to modulate light flux by a pulse modulation method, a scanning beam spot formed by the light flux on a scanned surface is more greatly affected by the pulse width of the light flux when the diameter of a stationary beam spot formed on the scanned surface by stationary light flux (hereinafter referred to as a stationary beam spot) is relatively small than when the diameter of the stationary beam spot is relatively large. A stationary beam spot formed by a light flux has stationary beam spot diameters substantially the same in the main scanning and sub-scanning directions. Because a scanning beam spot formed by the light flux on a scanned surface moves in the main scanning direction to scan the scanned surface, the diameter of the scanning beam spot on the scanned surface in the main scanning direction is larger than that in the sub-scanning direction. That is, when electrostatic latent images of vertical and horizontal lines having the same width are formed by a scanning beam spot which is relatively small, in the electrostatic latent images, the widths of the vertical and horizontal lines are different.

SUMMARY OF THE INVENTION

The present invention has been made in view of the above-discussed and other problems and addresses the above-discussed and other problems.

One object of the present invention is to provide a novel optical scanning device in which, even when a stationary beam spot diameter of a light source of the optical scanning device is made relatively small, the scanning beam spot diameters in the main scanning and sub-scanning directions are made substantially the same, and at the same time, the reciprocity phenomenon is prevented from occurring, so that broadening of an electrostatic latent image formed by the optical scanning device is avoided.

Further, another object of the present invention is to provide an image forming apparatus using an optical scanning device in which even when a stationary beam spot diameter of a light source of the optical scanning device is made relatively small, an electrostatic latent image of vertical and horizontal lines have substantially the same width when formed on a scanned surface of a photoconductor and the widths of the vertical and horizontal lines are made substantially the same so that an image having a relatively high resolution is outputted.

According to one preferred embodiment of the present invention, an optical scanning device for optically scanning a scanned surface of a photoconductor to form an electrostatic latent image thereupon includes a light source configured to emit a light flux and to modulate the light flux by a pulse modulation method. A deflector is configured to deflect the light flux from the light source. A scanning image formation element is included to condense the light flux deflected by the deflector to form a scanning beam spot on the scanned surface. The scanning beam spot scans the scanned surface and thereby forms the electrostatic latent image on the scanned surface. In the optical scanning device of this embodiment, the light source includes a semiconductor laser having an oscillating wavelength greater than 380 nm and smaller than 670 nm. A stationary beam spot, which is formed by the light flux on the scanned surface when the light flux is stationary, has a stationary beam spot diameter $\omega m$ in a main scanning direction that is smaller than a stationary beam spot diameter $\omega s$ in a sub-scanning direction. The scanning beam spot on the scanned surface moves substantially in the main scanning direction. The diameter $\omega m$ and the diameter $\omega s$ satisfy a following formula:

$$0.9\times[(\omega m^2+D^2)\times[\{(\omega m+D)/\omega m\}^{(1/8)}]]<\omega s<1.1\times[(\omega m^2+D^2)\times[\{(\omega m+D)/\omega m\}^{(1/8)}]],$$

where $D=Do\times Duty/100$, Do is a size of a picture element, and Duty is a duty percentage in modulating the light flux at the light source.

In the above-described optical scanning device, the diameter $\omega m$ and the diameter $\omega s$ can be set such that broadening of the electrostatic latent image on the scanned surface due to a reciprocity phenomenon is prevented from occurring.

Further, in the above-described optical scanning device, the diameter $\omega m$ and the diameter $\omega s$ can be set such that a diameter of the scanning beam spot on the scanned surface in the main scanning direction and a diameter of the scanning beam spot on the scanned surface in the sub-scanning direction are substantially the same.

Furthermore, the above-described optical scanning device may include an aperture configured to shield a peripheral portion of the light flux emitted from the light source, and the diameter $\omega m$ and the diameter $\omega s$ can be regulated by widths of the aperture in the main scanning and sub-scanning directions.

According to another preferred embodiment of the present invention, an image forming apparatus includes a photoconductor and an optical scanning device configured as described above to scan a scanned surface of the photoconductor to form an electrostatic latent image thereupon.

Still another preferred embodiment of the present invention includes an optical scanning method for scanning a scanned surface of a photoconductor to form an electrostatic latent image thereupon. The method includes emitting a light flux and modulating the light flux by a pulse modulation method at a light source including a semiconductor laser having an oscillating wavelength greater than 380 nm and smaller than 670 nm, deflecting the light flux and condensing the deflected light flux to form a scanning beam spot on the scanned surface, and scanning the scanning beam spot on the scanned surface by substantially moving in the main scanning direction and thereby forming the electrostatic latent image on the scanned surface. In the optical scanning method of this embodiment, a stationary beam spot, which is formed by the light flux on the scanned surface when the light flux is stationary, has a stationary beam spot diameter Tm in a main scanning direction that is smaller than a stationary beam spot diameter $\omega s$ in a sub-scanning direction, and the diameter $\omega m$ and the diameter $\omega s$ satisfy a following formula:

$$0.9 \times [(\omega m^2 + D^2) \times [\{(\omega m + D)/\omega m\}^{\wedge}(\frac{1}{8})]] < \omega s < 1.1 \times [(\omega m^2 + D^2) \times [\{(\omega m + D)/\omega m\}^{\wedge}(\frac{1}{8})]],$$

where $D = Do \times Duty/100$, Do is a size of a picture element, and Duty is a duty percentage in modulating the light flux at the light source.

In the above-described optical scanning method, the diameter $\omega m$ and the diameter $\omega s$ can be set such that broadening of the electrostatic latent image on the scanned surface due to a reciprocity phenomenon is prevented from occurring.

Further, in the above-described optical scanning method, the diameter $\omega m$ and the diameter $\omega s$ can be set such that a diameter of the scanning beam spot on the scanned surface in the main scanning direction and a diameter of the scanning beam spot on the scanned surface in the sub-scanning direction are substantially the same.

Furthermore, the optical scanning method may further include the step of shielding a peripheral portion of the light flux emitted from the light source, so that the diameter $\omega m$ and the diameter $\omega s$ are regulated by widths of the aperture in the main scanning and sub-scanning directions.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 7 is a table showing exemplary stationary been spots.

DETAILED DESCRIPTION OF THE PREFERRED EMBODIMENTS

Figure 1:
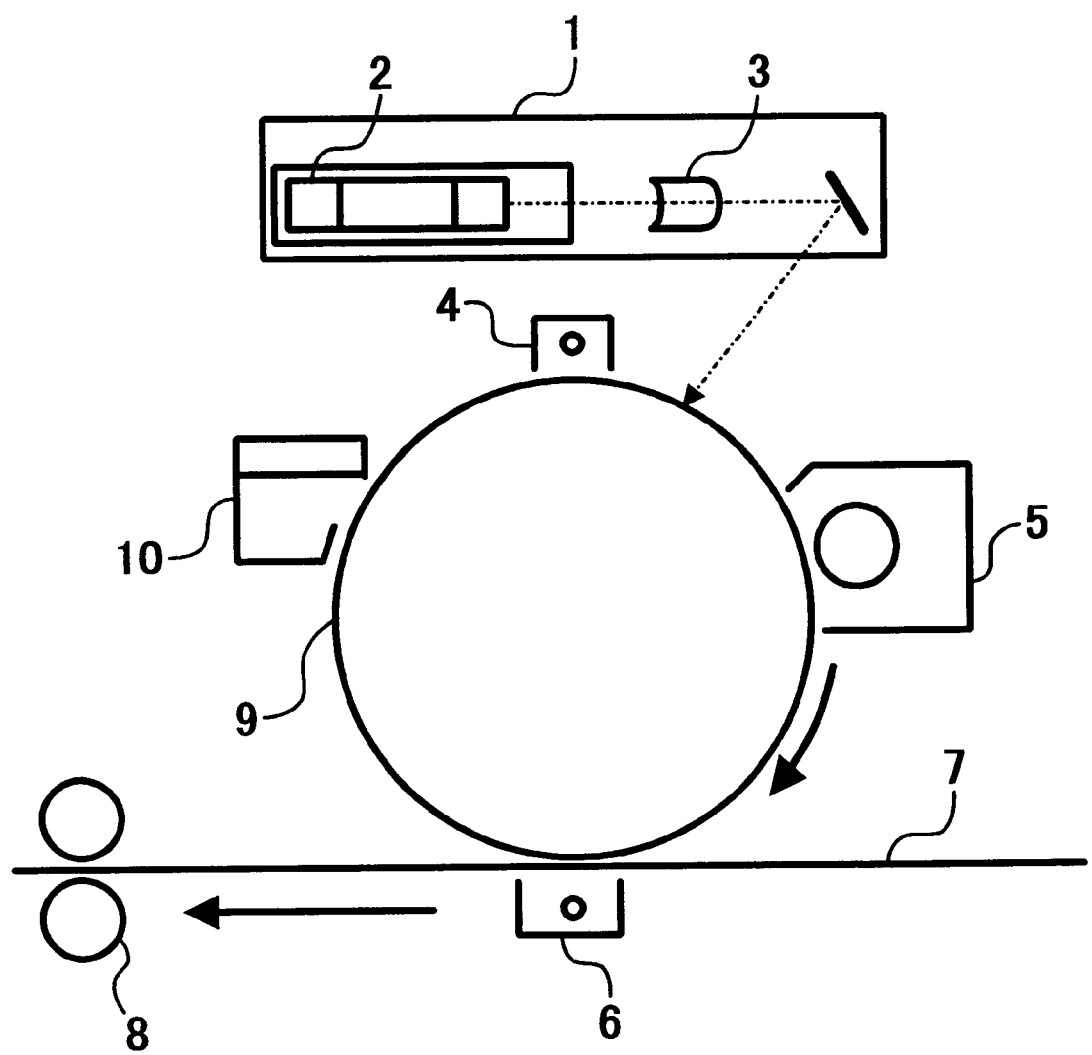
FIG. 1 is a schematic drawing illustrating an image forming apparatus according to one preferred embodiment of the present invention.

Referring now to the drawings, wherein like reference numerals designate identical or corresponding parts throughout the several views, preferred embodiments of the present invention are described.

FIG. 1 illustrates an image forming apparatus according to one preferred embodiment of the present invention. The image forming apparatus includes an optical scanning device 1, a charging device 4, a developing device 5, a transferring charging device 6, a fixing device 8, a photoconductor 9, and a cleaning device 10. The image forming apparatus of the present invention operates substantially in the same manner as known. For example, the photoconductor 9 is uniformly charged by the charging device 4. The electric charge on the photoconductor 9 decreases according to light intensity distribution formed by the optical scanning device 1, so that an electrostatic latent image is formed on the photoconductor 9. The developing device 5 then applies toner onto the electrostatic latent image, so that a toner image is formed on the photoconductor 9. The toner image is then transferred onto a sheet by the transferring charging device 6, and the toner image is fixed onto the sheet by the fixing device 8. The cleaning device 10 removes residual toner from the photoconductor 9.

Figure 2:
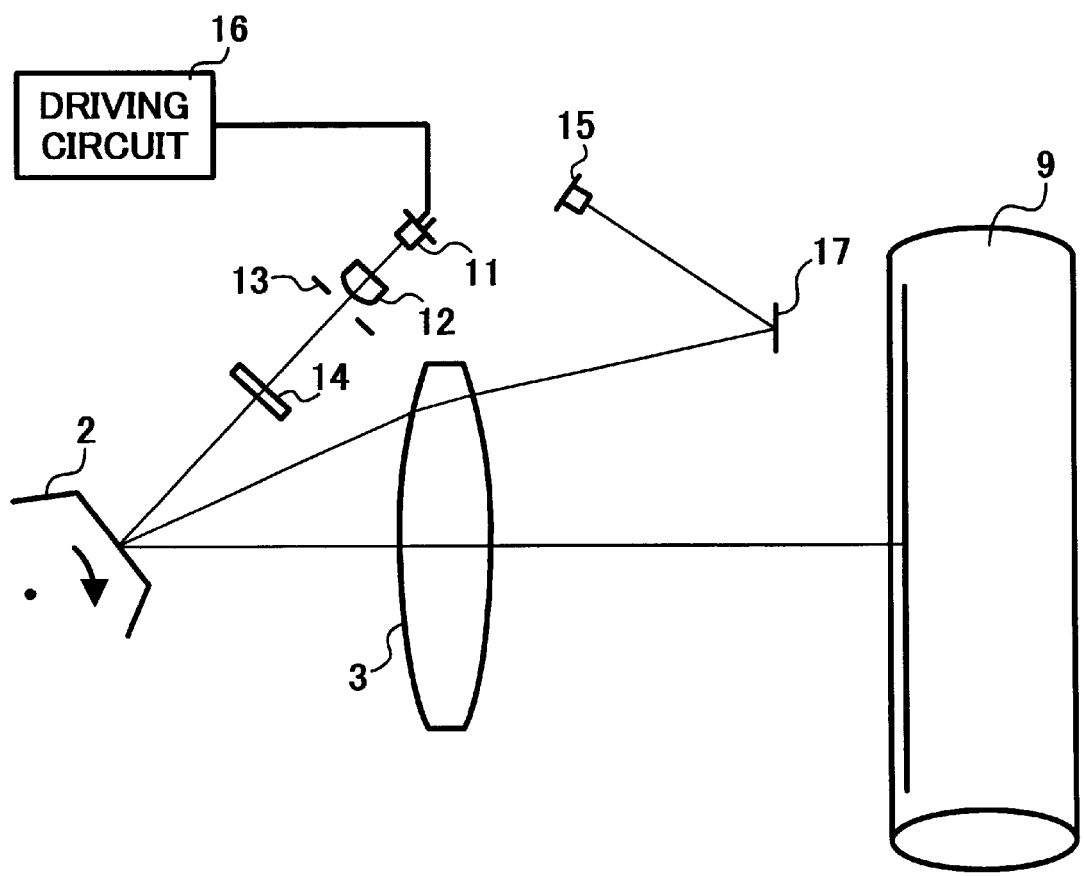
FIG. 2 is a schematic drawing illustrating an optical arrangement of an optical scanning device according to one preferred embodiment of the present invention.

FIG. 2 illustrates an exemplary optical arrangement of the optical scanning device 1 according to one preferred embodiment of the present invention. The optical scanning device 1 includes a semiconductor laser 11 as a light source, a coupling lens 12, an aperture 13, a cylindrical lens 14, a deflector 2, a scanning lens 3, a light receiving element 15, a driving circuit 16, and a mirror 17.

The semiconductor laser 11 is driven by the driving circuit 16 to modulate by a pulse modulation method light flux according to image data.

A light flux emitted from the semiconductor laser 11 is coupled by the coupling lens 12, and after passing the aperture 13 shielding a peripheral portion of the light flux, passes the cylindrical lens 14 serving as an image forming lens having a power in the sub-scanning direction. The light flux is thereby formed into a line image along the main scanning direction in the vicinity of the deflector 2.

The light flux is deflected by the deflector 2, which is driven by a driving device (not shown) to rotate in the direction indicated by an arrow in FIG. 2, so that a scanning beam spot, which is formed on a scanned surface of the photoconductor 9 by condensing the deflected light flux with the scanning lens 3 serving as a scanning image formation lens, scans the scanned surface. The direction in which a scanning beam spot scans on the scanned surface of the photoconductor 9 is referred to as the main scanning direction and the direction perpendicular to the main scanning direction is referred to as the sub-scanning direction.

In this embodiment, the wavelength $\lambda$ of a light flux emitted from the semiconductor laser 11 is in a range 380 nm$<\lambda<$670 nm.

The mirror 17 is arranged in a position where light flux passes the scanning lens 3 before reaching the photoconductor 9. The light flux reflected by the mirror 17 is incident on the light receiving element 15.

Figure 4A:
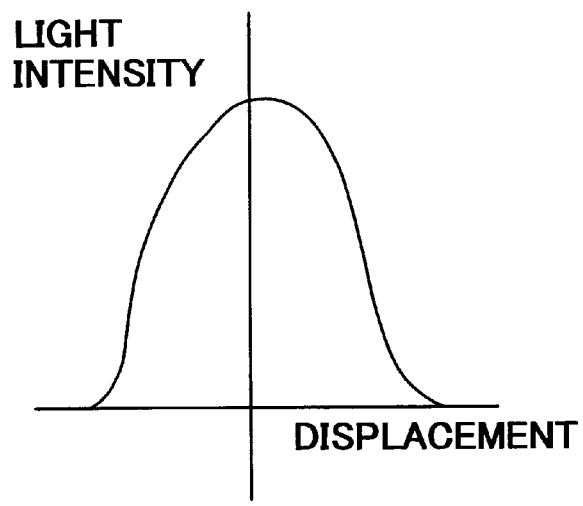
FIG. 4A is a diagram illustrating an exemplary light intensity distribution of a beam spot formed on a scanned surface of a photoconductor.
Figure 4B:
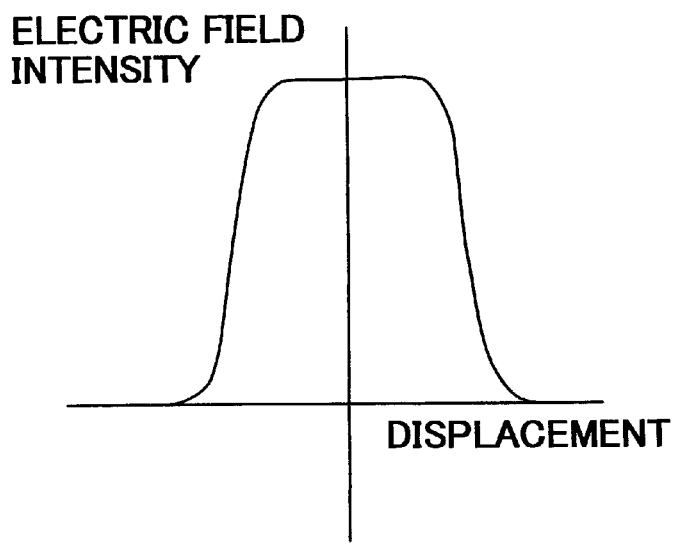
FIG. 4B is a diagrams illustrating exemplary electric field intensity distribution of the beam spot formed on the scanned surface.
Figure 4C:
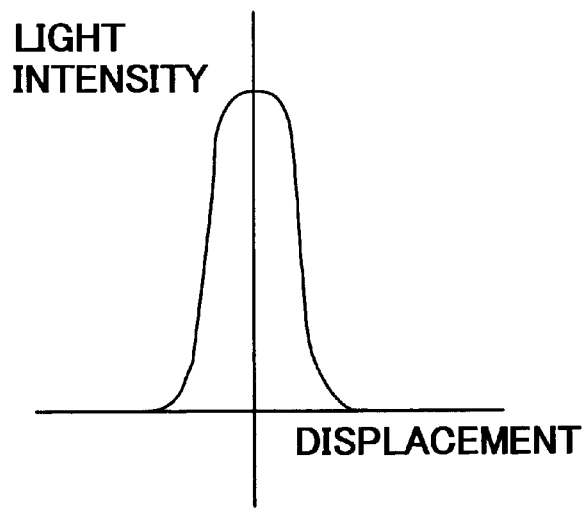
FIG. 4C is a diagram illustrating another exemplary light intensity distribution of a beam spot formed on the scanned surface.
Figure 4D:
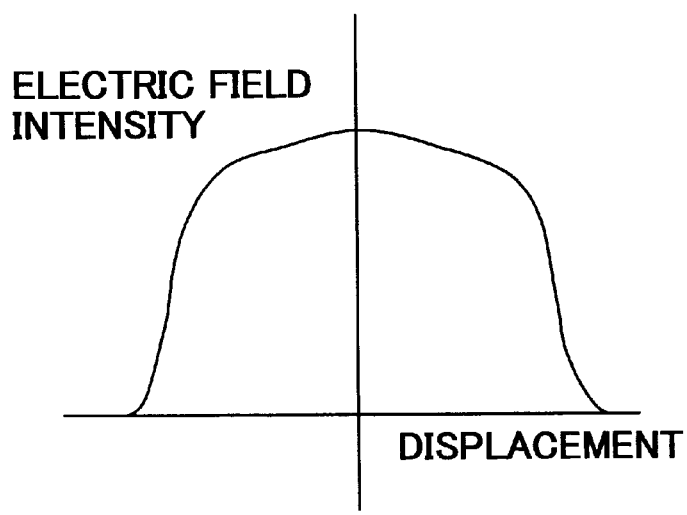
FIG. 4D is a diagram illustrating another exemplary electric field intensity distribution of the beam spot formed on the scanned surface.

FIG. 4A and FIG. 4C illustrate examples of light intensity distributions of beam spots formed on a scanned surface of the photoconductor 9, and FIG. 4B and FIG. 4D illustrate examples of electric field intensity distributions of the beam spots formed on the scanned surface of the photoconductor 9.

A beam spot having the light intensity distribution illustrated in FIG. 4A, for example, is formed on the scanned surface of the photoconductor 9 uniformly charged by the charging device 9, and according to the light intensity distribution, an electrostatic latent image having the characteristic illustrated in FIG. 4B is formed on the scanned surface. The electrostatic latent image is developed with toner to be formed as a toner image. The toner image is then transferred onto a sheet 7, so that an image is formed on the sheet 7.

If the diameter of a scanning beam spot forming light intensity distribution on a scanned surface of the photoconductor 9 is too small, for example as illustrated in FIG. 4C, the density of generated electric charge is excessively large, causing the electric charge to disperse in neighboring areas, thereby causing a problem that an electrostatic latent image formed according to the light intensity distribution is broadened as illustrated in FIG. 4D. This problem is the aforementioned reciprocity phenomenon.

Figure 3:
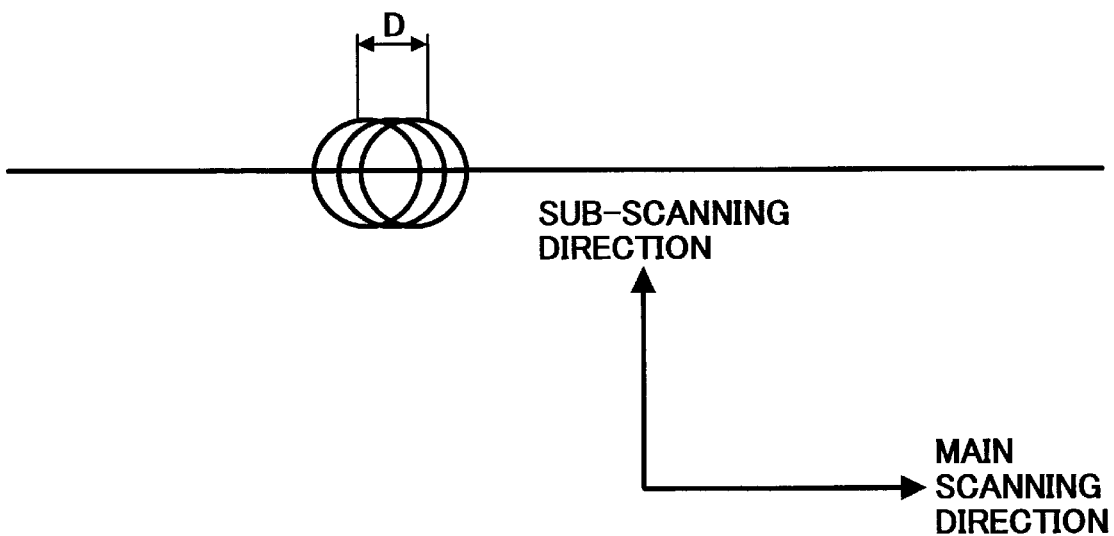
FIG. 3 is a diagram illustrating a state in which a beam spot having the same stationary beam spot diameter in the main scanning and sub-scanning directions moves in the main scanning direction.

When a light source is configured to modulate a light flux by a pulse modulation method and when a stationary beam spot, which is formed on a scanned surface by the light flux when the light flux is stationary, has stationary beam spot diameters substantially the same in the main scanning and sub-scanning directions, because the scanning beam spot on the scanned surface moves in the main scanning direction to scan the scanned surface as illustrated in FIG. 3, the width the scanning beam spot on the scanned surface in the main scanning direction is larger than the width of the scanning beam spot in the sub-scanning direction.

Figure 5:
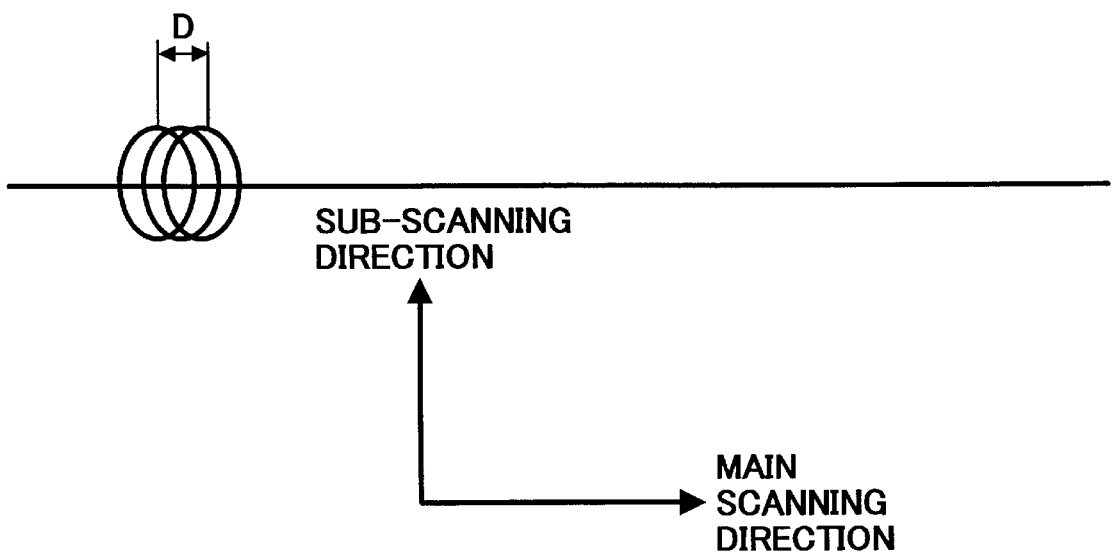
FIG. 5 is a diagram illustrating an example in which a stationary beam spot diameter of a stationary beam spot in the main scanning direction is made smaller than a stationary beam spot diameter in the sub-scanning direction thus preventing the reciprocity phenomenon from occurring.

Accordingly, when a light source using the semiconductor laser 11 emits a light flux having a relatively short wavelength so that the diameter of a scanning beam spot formed by the light flux on a scanned surface is relatively small, the reciprocity phenomenon occurs only in the sub-scanning direction. For preventing the reciprocity phenomenon from occurring, as illustrated in FIG. 5, the stationary beam spot diameter in the sub-scanning direction of a stationary beam spot formed by light flux on the scanned surface when the light flux is stationary is made larger than the beam spot diameter of the stationary beam spot in the main scanning diameter direction.

Thus, in an optical scanning device of the present invention which includes a light source configured to modulate a light flux by a pulse modulation method, a deflector configured to deflect the light flux from the light source, a scanning image formation element configured to condense the light flux deflected by the deflector to form a scanning beam spot on the scanned surface, and an imaging lens configured to direct light flux from the light source to the deflector, by using a semiconductor laser having an oscillating wavelength greater than 380 nm and smaller than 670 nm for the light source, the diameter of a scanning beam spot on the scanned surface can be made relatively small. However, when the diameter of a scanning beam spot is made relatively small, the scanning beam spot can be affected by a pulse width of the light flux, and at the same time, the reciprocity phenomenon must be prevented from occurring.

According to the above-described preferred embodiment of the present invention, by making the stationary beam spot diameter in the sub-scanning direction of a stationary beam spot on a scanned surface larger than the stationary beam spot diameter in the main scanning direction, the scanning beam spot diameters in the main scanning and sub-scanning directions of a scanning beam spot scanning the scanned surface are made substantially the same, and at the same time the occurrence of the reciprocity phenomenon is avoided. Thereby, broadening of a resulting electrostatic latent image is avoided.

The stationary beam spot diameters in the main scanning and sub-scanning directions of a stationary beam spot formed by a light flux on a scanned surface when the light flux is stationary can be regulated by respective widths of the aperture 13 in the main scanning and sub-scanning directions.

Next, a description is given on a relation between stationary beam spot diameters in the main scanning and sub-scanning directions of a stationary beam spot formed by a light flux on a scanned surface when the light flux is stationary and a scanning beam spot diameter formed by the light flux on the scanned surface have beam spot diameters substantially the same in the main scanning and sub-scanning directions.

When the semiconductor laser 11 is configured to emit a light flux having a relatively small wavelength so that the diameter of a scanning beam spot is relatively small, the light intensity distribution of the beam spot on the scanned surface is closely reproduced in a resulting toner image.

Further, when the stationary beam spot diameter of a stationary beam spot in the main scanning direction, which is defined by $1/e^2$ of the maximum light intensity of a light flux forming the beam spot, is represented by $\omega m$, the diameter in the main scanning direction of a scanning beam spot when the light source is configured to modulate the light flux by a pulse modulation method is approximately expressed by the following formula:

$$(\omega m^2 + D^2) \times [\{(\omega m + D)/\omega m\}^{(1/8)}],$$

where $D = Do \times Duty/100$, Do is a size of a picture element, and Duty is a duty percentage in modulating the light flux at the light source.

Figure 6A:
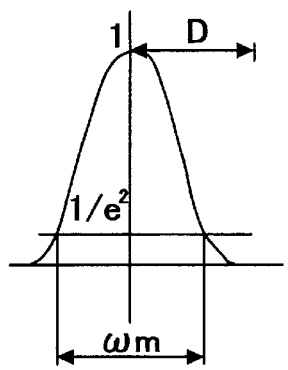
FIG. 6A is a diagram illustrating an exemplary stationary beam spot having a stationary beam spot diameter $\omega m$ in the main scanning direction.
Figure 6A:
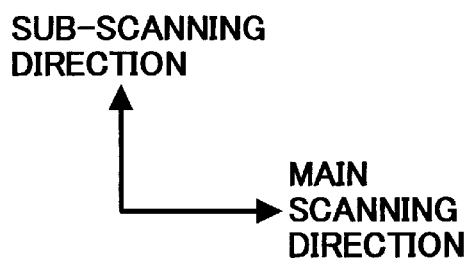
Figure 6B:
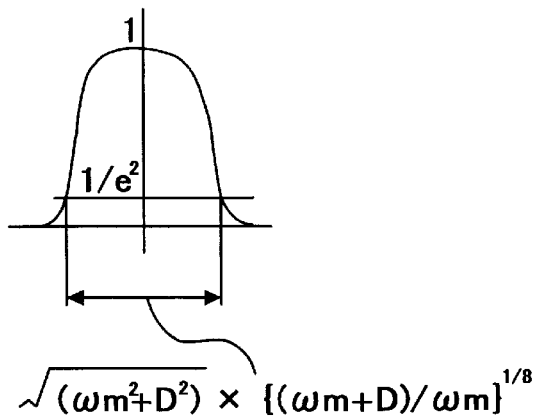
FIG. 6B is a diagram illustrating an exemplary scanning beam spot which is formed on the scanned surface of the photoconductor when the stationary beam spot having the stationary beam spot diameter $\omega m$ in the main scanning direction moves in the main scanning direction by a distance D illustrated in FIG. 6A.
Figure 6B:
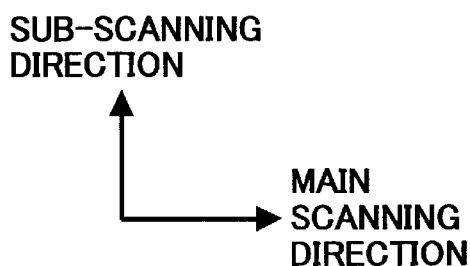

FIG. 6A illustrates an exemplary stationary beam spot having a stationary beam spot diameter $\omega m$ in the main scanning direction, and FIG. 6B illustrates an exemplary scanning beam spot which is formed on the scanned surface of the photoconductor 9 when the beam spot having the stationary beam spot diameter $\omega m$ in the main scanning direction moves in the main scanning direction by a distance of D illustrated in FIG. 6A. As illustrated in FIG. 6B, the diameter of the scanning beam spot in the main scanning direction is larger than the stationary beam spot diameter $\omega m$ of the stationary beam spot in the main scanning direction.

Here, because the scanning beam spot does not scan the scanned surface in the sub-scanning direction, the stationary beam spot diameter of $\omega s$ of a stationary beam spot in the sub-scanning direction and the diameter of the scanning beam spot in the sub-scanning direction are substantially the same.

Accordingly, for diameters in the main scanning and sub-scanning directions of a scanning beam spot on the scanned surface of the photoconductor 9 to be made substantially the same, the following formula must be satisfied:

$$0.9 \times [(\omega m^2 + D^2) \times [\{(\omega m + D)/\omega m\}^{(1/8)}]] < \omega s < 1.1 \times [(\omega m^2 + D^2) \times [\{(\omega m + D)/\omega m\}^{(1/8)}]].$$

FIG. 7 is a table showing exemplary stationary beam spots having various stationary beam spot diameters $\omega m$ in the main scanning direction and stationary beam spot diameters $\omega s$ in the sub-scanning direction. A beam spot diameter can be measured by scanning a measuring head in which a slit and a light receiving element are combined. The measuring point may be set, for example, to a center of an image area.

By setting the stationary beam spot diameter $\omega s$ of a stationary beam spot in the sub-scanning direction to be between upper and low limits of the above-described formula indicated in the table of FIG. 7, the diameters in the main scanning and sub-scanning directions of a scanning beam spot on a scanned surface of the photoconductor 9 can be made substantially the same. Thereby, the reciprocity phenomenon can be suppressed, so that, in an electrostatic image of vertical and horizontal lines having substantially the same width and formed on the scanned surface, the widths of the vertical and horizontal lines are substantially the same.

As described earlier, the stationary beam spot diameters in the main scanning and sub-scanning directions of a stationary beam spot formed by a light flux on a scanned surface of the photoconductor 9 when the light flux is stationary can be regulated by respective widths of the aperture 13 in the main scanning and sub-scanning directions.

A stationary beam spot diameter $\omega m$ in the main scanning direction and a stationary beam spot diameter $\omega s$ in the sub-scanning direction are approximately expressed by the following formulas:

$$\omega m = 1.64 \times \lambda \times fm/Am$$

$$\omega s = 1.64 \times \lambda \times fs/As,$$

where $\lambda$ represents a wavelength of a light source, fin represents a focal length of an optical system after an aperture in the main scanning direction, fs represents a focal length of the optical system after the aperture in the sub-scanning direction, Am represents a width of the aperture in the main scanning direction, and As represents a width of the aperture in the sub-scanning direction.

Under the condition of example 1 in table of FIG. 7, when fm=200 mm, by making the aperture width Am of the aperture 13 to 8.2 mm, the stationary spot diameter $\omega m$ in the main scanning direction is 16:m, and when fs=−50 mm, by making the aperture width As of the aperture 13 to 1.1 mm, then the stationary spot diameter $\omega s$ in the sub-scanning direction is 30:m.

Similarly, under the conditions of examples 2 and 3 in table of FIG. 7, by appropriately setting the aperture width Am of the aperture 13 in the main scanning direction and the aperture width As in the sub-scanning direction according to the focal length of an optical system after the aperture 13, desired stationary spot diameter $\omega m$ in the main scanning direction and stationary spot diameter $\omega s$ in the sub-scanning direction can be obtained.

Thus, according to the above-described preferred embodiment of the present invention, where $D = Do \times Duty/100$, Do represents a size of a picture element, and Duty represents a duty percentage in modulating the light flux at the light source, by making the stationary beam spot diameters $\omega m$ in the main scanning direction and stationary beam spot diameters $\omega s$ in the sub-scanning direction of a stationary beam spot to satisfy the formula, $$0.9 \times [(\omega m^2 + D^2) \times [\{(\omega m + D)/\omega m\}^{(1/8)}]] < \omega s < 1.1 \times [(\omega m^2 + D^2) \times [\{(\omega m + D)/\omega m\}^{(1/8)}]],$$

an optical scanning device in which the diameters of a scanning beam spot in the main scanning and sub-scanning directions are substantially the same is realized.

The preferred embodiments have been described for a case where the light source includes a semiconductor laser 11. However, the present invention can be applied to a case where the light source includes a plurality of semiconductor lasers 11.

Further, in the above-described embodiments, the wavelength $\lambda$ of a light flux emitted from the semiconductor laser 11 is in the range; 380 nm<$\lambda$<670 nm. More preferably, the wavelength $\lambda$ is in the range of 380 nm<$\lambda$<500 nm.

Furthermore, in the light source 11 modulating a light flux by a pulse modulation method, the pattern of a pulse can be varied according to image information.

By using the optical scanning device 1 illustrated in FIG. 2 in an image forming apparatus according to the above-described preferred embodiments of the present invention, the diameters in the main scanning and sub-scanning directions of a scanning beam spot formed on a scanned surface of the photoconductor 9 can be made substantially the same. Thereby, in an electrostatic latent image of vertical and horizontal lines having substantially the same width and formed on the scanned surface of the photoconductor 9, the widths of the vertical and horizontal lines are made substantially the same, thus suppressing occurrence of the reciprocity phenomenon. Accordingly, the resolution of an output image of the image forming apparatus is increased.

Numerous additional modifications and variations of the present invention are possible in light of the above teachings. It is therefore to be understood that within the scope of the appended claims, the present invention may be practiced otherwise than as specifically described herein.

What is claimed is:

1. An optical scanning device for optically scanning a surface of a photoconductor to form an electrostatic latent image thereupon, comprising:

a light source including a semiconductor laser having an oscillating wavelength greater than 380 nm and smaller than 670 nm, said light source configured to emit a light flux and to pulse modulate the light flux by a pulse modulation method;

a deflector configured to deflect the light flux from the light source; and a scanning image formation element configured to condense the light flux deflected by the deflector, to form a scanning beam spot on the scanned surface, and to scan the scanning beam spot across the scanned surface thereby to form the electrostatic latent image on the scanned surface, wherein the scanning image formation element configures the scanning beam spot such that a stationary beam spot, formed by stationary light flux on the scanned surface, has a stationary beam spot diameter ωm in a main scanning direction that is smaller than a stationary beam spot diameter ωs in a sub-scanning direction, the scanning beam spot on the scanned surface is configured to move substantially in the main scanning direction, and the diameter ωm and the diameter ωs satisfy a following formula, $$0.9\times[(\omega m^2+D^2)\times[\{(\omega m+D)/\omega m\}^{(1/8)}]]<\omega s<1.1\times[(\omega m^2+D^2)\times[\{(\omega m+D)/\omega m\}^{(1/8)}]],$$

where $D=Do\times Duty/100$, Do is a size of a picture element, and Duty is a duty percentage in pulse modulating the light flux at the light source.

2. The optical scanning device according to claim 1, wherein the diameter ωm and the diameter ωs are set such that broadening of the electrostatic latent image on the scanned surface due to a reciprocity phenomenon associated with charge dispersion on the scanned surface of the photoconductor is prevented from occurring.

3. The optical scanning device according to claim 1, wherein the diameter ωm and the diameter ωs are set such that a diameter of the scanning beam spot on the scanned surface in the main scanning direction and a diameter of the scanning beam spot on the scanned surface in the sub-scanning direction are substantially the same.

4. The optical scanning device according to claim 1, further comprising:

an aperture configured to shield a peripheral portion of the light flux emitted from the light source, wherein the diameter ωm and the diameter ωs are regulated by widths of the aperture in the main scanning and sub-scanning directions.

5. An image forming apparatus, comprising:

a photoconductor; and an optical scanning device configured to optically scan a surface of the photoconductor to form an electrostatic latent image thereupon, the optical scanning device including, a light source including a semiconductor laser having an oscillating wavelength greater than 380 nm and smaller than 670 nm, said light source configured to emit a light flux and to pulse modulate the light, a deflector configured to deflect the light flux from the light source, a scanning image formation element configured to condense the light flux deflected by the deflector, to form a scanning beam spot on the scanned surface, and to scan the scanning beam spot across the scanned surface to thereby form the electrostatic latent image on the scanned surface, wherein the scanning image formation element configures the scanning beam spot such that a stationary beam spot, formed by stationary light flux on the scanned surface, has a stationary beam spot diameter ωm in a main scanning direction that is smaller than a stationary beam spot diameter ωs in a sub-scanning direction, the scanning beam spot on the scanned surface is configured to move substantially in the main scanning direction, and the diameter ωm and the diameter ωs satisfy a following formula, $$0.9\times[(\omega m^2+D^2)\times[\{(\omega m+D)/\omega m\}^{(1/8)}]]<\omega s<1.1\times[(\omega m^2+D^2)\times[\{(\omega m+D)/\omega m\}^{(1/8)}]],$$

where $D=Do\times Duty/100$, Do is a size of a picture element, and Duty is a duty percentage in modulating the light flux at the light source.

6. The image forming apparatus according to claim 5, wherein the diameter ωm and the diameter ωs are set such that broadening of the electrostatic latent image on the scanned surface due to a reciprocity phenomenon associated with charge dispersion on the scanned surface of the photoconductor is prevented from occurring.

7. The image forming apparatus according to claim 5, wherein the diameter ωm and the diameter ωs are set such that a diameter of the scanning beam spot on the scanned surface in the main scanning direction and a diameter of the scanning beam spot on the scanned surface in the sub-scanning direction are substantially the same.

8. The image forming apparatus according to claim 5, wherein the optical scanning device further comprises:

an aperture configured to shield a peripheral portion of the light flux emitted from the light source, wherein the diameter ωm and the diameter ωs are regulated by widths of the aperture in the main scanning and sub-scanning directions.

9. An optical scanning device for optically scanning a surface of a photoconductor to form an electrostatic latent image thereupon, comprising:

means for emitting a light flux having an oscillating wavelength greater than 380 nm and smaller than 670 nm and for pulse modulating the light flux;

means for deflecting the light flux from the light emitting means;

means for condensing the light flux deflected by the deflecting means to form a scanning beam spot on the scanned surface; and means for scanning the scanning beam spot across the scanned surface thereby to form the electrostatic latent image on the scanned surface, wherein the means for scanning configures the scanning beam spot such that a stationary beam spot, formed by stationary light flux on the scanned surface, has a stationary beam spot diameter ωm in a main scanning direction that is smaller than a stationary beam spot diameter ωs in a sub-scanning direction, the scanning beam spot on the scanned surface is configured to move substantially in the main scanning direction, and the diameter ωm and the diameter ωs satisfy a following formula, $$0.9\times[(\omega m^2+D^2)\times[\{(\omega m+D)/\omega m\}^{\wedge}(1/8)]]<\omega s<1.1\times[(\omega m^2+D^2)\times[\{(\omega m+D)/\omega m\}^{\wedge}(1/8)]],$$

where D=Do×Duty/100, Do is a size of a picture element, and Duty is a duty percentage in modulating the light flux at the light emitting means.

10. An image forming apparatus, comprising:

a photoconductor; and an optical scanning device configured to optically scan a surface of the photoconductor to form an electrostatic latent image thereupon, the optical scanning device including, means for emitting a light flux having an oscillating wavelength greater than 380 nm and smaller than 670 nm and for pulse modulating the light;

means for deflecting the light flux from the light emitting means;

means for condensing the light flux deflected by the deflecting means to form a scanning beam spot on the scanned surface; and means for scanning the scanning beam spot across the scanned surface thereby to form the electrostatic latent image on the scanned surface, wherein the means for scanning configures the scanning beam spot such that a stationary beam spot, formed by stationary light flux on the scanned surface, has a stationary beam spot diameter ωm in a main scanning direction that is smaller than a stationary beam spot diameter ωs in a sub-scanning direction, the scanning beam spot on the scanned surface moves substantially in the main scanning direction, and the diameter ωm and the diameter ωs satisfy a following formula, $$0.9\times[(\omega m^2+D^2)\times[\{(\omega m+D)/\omega m\}^{\wedge}(1/8)]]<\omega s<1.1\times[(\omega m^2+D^2)\times[\{(\omega m+D)\omega m\}(1/8)]],$$

where D=Do×Duty/100, Do is a size of a picture element, and Duty is a duty percentage in modulating the light flux at the light emitting means.

11. An optical scanning method of scanning a scanned surface of a photoconductor to form an electrostatic latent image thereupon, comprising:

emitting a light flux having an oscillating wavelength greater than 380 nm and smaller than 670 nm and pulse modulating the light flux;

deflecting the light flux from the light source;

condensing the deflected light flux to form a scanning beam spot on the scanned surface;

scanning the scanning beam spot on the scanned surface by moving the scanning beam spot substantially in the main scanning direction to scan the scanned surface; and forming thereby the electrostatic latent image on the scanned surface, wherein said scanning configures the scanning beam spot such that a stationary beam spot, formed by stationary light flux on the scanned surface, has a stationary beam spot diameter ωm in a main scanning direction that is smaller than a stationary beam spot diameter ωs in a sub-scanning direction, and the diameter ωm and the diameter ωs satisfy a following formula, $$0.9\times[(\omega m^2+D^2)\times[\{(\omega m+D)/\omega m\}^{\wedge}(1/8)]]<\omega s<1.1\times[(\omega m^2+D^2)\times[\{(\omega m+D)/\omega m\}^{\wedge}(1/8)]],$$

where D=Do×Duty/100, Do is a size of a picture element, and Duty is a duty percentage in modulating the light flux at the light source.

12. The optical scanning method according to claim 11, further comprising:

setting the diameter ωm and the diameter ωs such that broadening of the electrostatic latent image on the scanned surface due to a reciprocity phenomenon associated with charge dispersion on the scanned surface of the photoconductor is prevented from occurring.

13. The optical scanning method according to claim 11, further comprising:

setting the diameter ωm and the diameter ω such that a diameter of the scanning beam spot on the scanned surface in the main scanning direction and a diameter of the scanning beam spot on the scanned surface in the sub-scanning direction are substantially the same.

14. The optical scanning method according to claim 11, further comprising:

shielding a peripheral portion of the light flux emitted from the light source, so that the diameter ωm and the diameter ωs are regulated by widths of an aperture in the main scanning and sub-scanning directions.

15. An image forming method of forming an image on a photoconductor, comprising:

optically scanning a surface of the photoconductor to form an electrostatic latent image thereupon, the scanning step including, emitting a light flux having an oscillating wavelength greater than 380 nm and smaller than 670 nm and pulse modulating the light flux, deflecting the light flux from the light source, condensing the deflected light flux to form a scanning beam spot on the scanned surface, scanning the scanning beam spot on the scanned surface by moving the scanning beam spot substantially in the main scanning direction to scan the scanned surface, and forming thereby the electrostatic latent image on the scanned surface, wherein said scanning configures the scanning beam spot such that a stationary beam spot, formed on the scanned surface by stationary light flux, has a stationary beam spot diameter ωm in a main scanning direction that is smaller than a stationary beam spot diameter ωs in a sub-scanning direction, and the diameter ωm and the diameter ωs satisfy a following formula, $$0.9\times[(\omega m^2+D^2)\times[\{(\omega m+D)/\omega m\}^{\wedge}(1/8)]]<\omega s<1.1\times[(\omega m^2+D^2)\times[\{(\omega m+D)\omega m\}^{\wedge}(1/8)]],$$

where D=Do×Duty/100, Do is a size of a picture element, and Duty is a duty percentage in modulating the light flux at the light source; and developing the latent image with toner to form the image on the photoconductor.

16. The image forming method according to claim 15, further comprising:

setting the diameter $\omega m$ and the diameter $\omega s$ such that broadening of the electrostatic latent image on the scanned surface due to a reciprocity phenomenon associated with charge dispersion on the scanned surface of the photoconductor is prevented from occurring.

17. The image forming method according to claim 15, further comprising:

setting the diameter $\omega m$ and the diameter $\omega s$ such that a diameter of the scanning beam spot on the scanned surface in the main scanning direction and a diameter of the scanning beam spot on the scanned surface in the sub-scanning direction are substantially the same.

18. The image forming method according to claim 15, the optically scanning step further comprises:

shielding a peripheral portion of the light flux emitted from the light source so that the diameter $\omega m$ and the diameter $\omega s$ are regulated by widths of an aperture in the main scanning and sub-scanning directions.

\* \* \* \* \*